United States Patent [19] [11] 3,692,372
Pineo [45] Sept. 19, 1972

[54] THERMALLY EXPANSIBLE BEARING ASSEMBLY

[72] Inventor: Carroll Benson Pineo, Seabrook, N.H.

[73] Assignee: General Electric Company

[22] Filed: June 24, 1971

[21] Appl. No.: 156,234

[52] U.S. Cl. .................308/15, 308/187, 308/207
[51] Int. Cl. ..................F16c 35/04, F16c 39/00
[58] Field of Search..........308/15, 207, 189, 22, 187

[56] References Cited

UNITED STATES PATENTS

| 1,676,894 | 7/1928 | Frank | 308/207 R |
| 1,792,618 | 2/1931 | Van Derhoef | 308/207 R |
| 2,747,367 | 5/1956 | Savin, Jr. | 60/39.16 |
| 3,276,827 | 10/1966 | Diver et al. | 308/187 |
| 3,393,024 | 7/1968 | Rhodes et al. | 308/22 |

Primary Examiner—Martin P. Schwadron
Assistant Examiner—Barry Grossman
Attorney—Edward S. Roman et al.

[57] ABSTRACT

A thermally expansible bearing assembly includes stress relief cuts in the circumferential structure thereof that permit a uniform radial expansion around the circumference of the outer bearing race when subjected to thermal stress.

3 Claims, 3 Drawing Figures

PATENTED SEP 19 1972 3,692,372
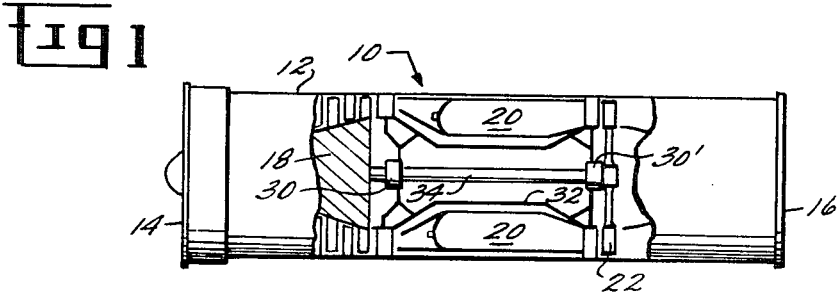
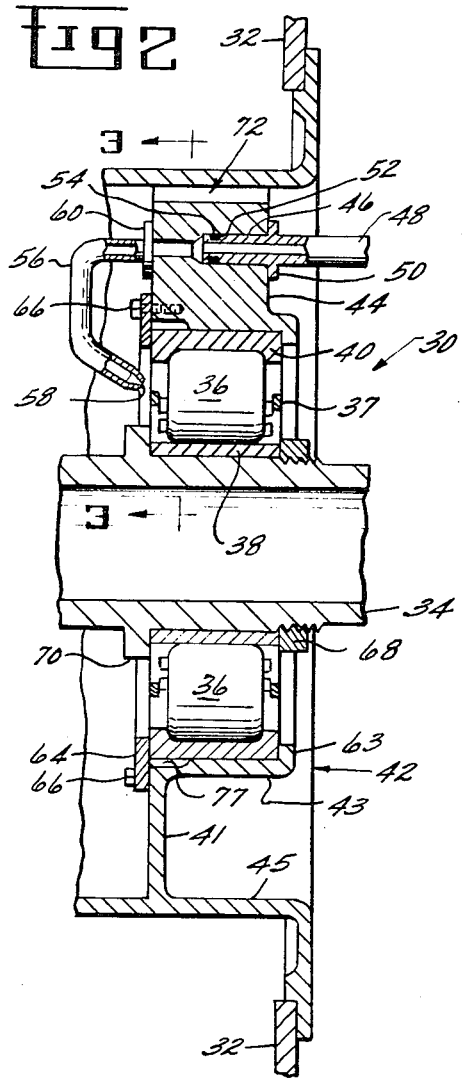
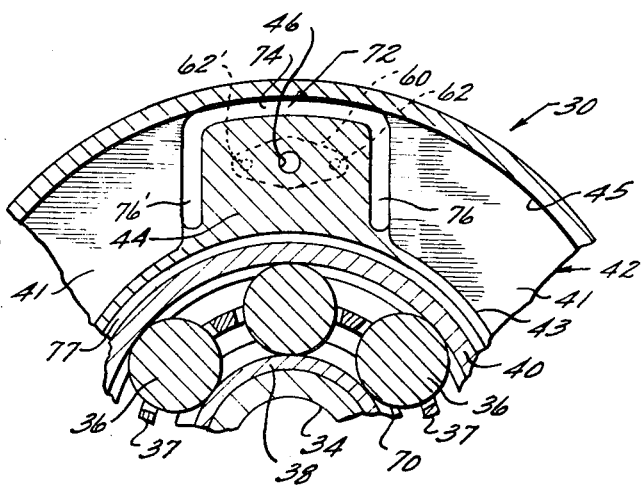
INVENTOR.
CARROLL B. PINEO
BY Edward S. Roman
ATTORNEY

THERMALLY EXPANSIBLE BEARING ASSEMBLY

BACKGROUND OF THE INVENTION

In general, this invention relates to a thermally expansible bearing assembly and more particularly to a bearing assembly as included in a gas turbine engine wherein the outer bearing race may be uniformly expanded in a radial direction around the circumference thereof when subjected to thermal stresses.

In gas turbine engines bearing assemblies are subjected to high thermal stresses resulting in the outward radial expansion of the bearing races. It is important that the radial expansion of the bearing races be uniform around the circumference of the race so as to preserve the concentricity of the bearing races when subjected to high thermal stress. Should the bearing races radially expand in an uneven manner, excessive localized loading will act to materially reduce the effective life of the bearing assembly and may even result in catastrophic engine failure.

Oftentimes, an outer annular bearing race will be connected to the engine frame by means of an annular bearing support plate disposed between the bearing race and engine frame. It is common in the art to pass lubricant pipes through the bearing support plate in order to supply lubricant to the moving surfaces of the bearing. Ordinarily the annular support plate must be strengthened in the area where the lubricant pipes pass through the plate by axially thickening the plate to form a boss through which the pipes pass. However, there often is a reduced radial expansion under thermal stress in the area of the boss, resulting in a non-uniform radial expansion around the circumference of the support plate. The non-uniform radial expansion of the support plate acts to stress the bearing race in a non-uniform manner effecting a loss of concentricity during thermal expansion and limiting the effective life of the bearing.

Therefore, it is an object of this invention to provide a bearing assembly for use in a gas turbine engine wherein radial expansion during thermal stress is substantially uniform around the circumference of the bearing races, notwithstanding a thickened area within the bearing support plate.

It is a further object of this invention to provide a bearing assembly for use in a gas turbine engine wherein the effective life of the bearing is materially increased by the maintenance of bearing race concentricity during thermal expansion.

It is also an object of this invention to provide a bearing assembly for use in a gas turbine engine wherein a non-uniform radial expansion around the circumference of a bearing component subjected to thermal stress is relieved by a unique cut through the particular bearing component.

SUMMARY OF THE INVENTION

A bearing assembly for retaining an elongated shaft for rotation relative to a gas turbine engine frame includes an annular inner bearing race disposed for rotation with the shaft, together with an annular outer bearing race concentric with the inner bearing race and spaced apart therefrom. A plurality of rollers are circumferentially disposed for rotation between the inner and outer bearing races. Also, an annular bearing support plate is disposed between and fixedly connects the outer race to the engine frame. The bearing support includes at least one axially thickened area on the circumference thereof which has a smaller radial expansion under thermal stress than generally found elsewhere on the circumference of the support plate. In order to provide for a uniform thermal radial expansion along the entire circumference of the support plate, a stress relief cut through the bearing support plate is provided. The stress relief cut through the bearing support plate includes a generally circumferential cut through the area of smaller radial expansion and two generally radial cuts extending inward from the ends of the circumferential cut on opposing sides of the area of smaller radial expansion thereby accommodating uniform radial expansion around the circumference of the outer bearing race.

DESCRIPTION OF THE DRAWINGS

While the specification concludes with claims distinctly claiming and particularly pointing out the invention described herein, it is believed that the invention will be more readily understood by reference to the discussion below and the accompanying drawings in which:

FIG. 1 is a side view of a typical gas turbine engine including the bearing assembly of the invention.

FIG. 2 is a cross-sectional view of the bearing assembly of this invention as shown in FIG. 1.

FIG. 3 is a cross-sectional view taken along the line 3—3 of FIG. 2.

DESCRIPTION OF THE PREFERRED EMBODIMENT

Referring first to FIG. 1, an aircraft gas turbine engine 10 of the turbojet type is illustrated wherein the engine includes a casing 12 of a generally cylindrical form having an inlet 14 and an exhaust nozzle 16 at opposite ends thereof. The gas turbine engine 10 also includes an axial flow compressor 18, a combustor 20, and a turbine 22 disposed in serial flow relationship between the inlet 14 and the exhaust nozzle 16. Connection between the turbine 22 and axial flow compressor 18 is provided by means of a shaft 34 which is rotatably disposed in relation to an engine frame 32. The shaft 34 is journalled in bearing assemblies shown generally at 30, 30', to be hereinafter described in full detail.

Referring now to FIG. 2 there is shown a detailed cross-sectional view of the bearing assembly 30. A broken away portion of the shaft 34 is shown as including an annular flange 70 extending from the surface thereof. The flange 70 may be formed integrally with the shaft 34 or may be an annular ring which is subsequently brazed to the shaft in a manner well known to the art. An inside annular bearing race 38 is shown as circumscribing the shaft 34. The inside bearing race 38 is maintained in fixed relation relative to the shaft 34 by means of a press fit between the annular flange 70 and an annular race retainer nut 68 which threadably engages the shaft 34. A plurality of rollers 36 are circumferentially disposed about the inner bearing race 38 and radially retained relative to the inner bearing race 38 by means of an outside annular bearing race 40. The term rollers as herein used is understood to include balls and cones or any other type of revolving means commonly disposed between two races to form a bearing assembly. The rollers 36 are circumferentially spaced apart by means of a roller cage 37 in a manner well known to the art. The outside bearing race 40 is radially spaced apart from the inside bearing race 38 and is maintained in concentric relation to the inside bearing race 38.

The outside bearing race 40 is fixedly retained relative to the engine frame 32 by means of an annular bearing support plate 42 wherein the support plate includes a radially extending circumferential plate 41, the inner diameter of which connects with an axially extending, circumferential flange 43, and the outer diameter of which connects with another axially extending circumferential flange 45. The inside surface of the axially extending circumferential flange 43 abuts the outside surface of the bearing race 40. The flange 43 includes an annular lip 63 extending radially inward, whereupon fixed connection is maintained between the outside bearing race 40 and the support plate 42 by disposing the race 40 between the lip 63 and an annular race retainer plate 64. The race retainer plate 64 is axially tightened against the radially extending sides of the outside bearing race 40 by means of retaining screws 66 which extend through the race retainer plate 64 and threadably engage the bearing support plate 42. To accommodate outward radial expansion under thermal stress, a conventional relief groove 77 is provided to overcome the radial stiffness of the support plate 42.

It is generally more convenient to pass lubricant pipes directly through the bearing support plate rather than to route the pipes around the bearing through intricate engine frame structure. The end of a lubricant inlet pipe 48 is shown as intruding within an aperture 46 which extends through an area of the bearing support plate 42 which has been thickened to form a localized boss 44 in order to adequately retain the lubricant pipe. The broken away end of the lubricant inlet pipe is connected to a source of lubricant (not shown). The other end of the lubricant inlet pipe includes an annular flange 50 extending radially outward from the surface thereof, so as to abut the radially extending face of the localized boss 44, and limit the distance which the lubricant pipe can be inserted within the aperture 46. The intruding end of the lubricant pipe includes an annular groove 52 around the outside surface thereof, within which an O-ring seal 54 is disposed to provide sealing engagement between the localized boss 44 and the lubricant pipe. The lubricant pipe 48 may be brazed to the boss in a manner well known to the art.

A lubricant outlet pipe 56 is shown in flow connection with the inlet pipe 48 and conducts lubricant to the area of the rollers 36, whereupon the lubricant is discharged through a nozzle 58 at the end of pipe 56. The lubricant may be conducted under pressure in order to discharge through the nozzle in a mist. The mist subsequently impinges on the contacting surface of the rollers and bearing races to lubricate the same. The inlet end of pipe 56 is maintained in contact with the radially extending face of the boss 44 by means of a flange 60 which extends radially outward from the center axis of the pipe 56. The flange 60 is maintained in abutting relation with the support plate by means of retaining screws 62, 62', as shown in FIG. 3, which extend through the flange 60 and threadably engage the support plate.

In order to facilitate an even and uniform outward radial thermal expansion of the outer bearing race 40 during engine operation, a series of unique stress relief cuts have been provided through the bearing support plate 42. When no stress relief is provided, the radial expansion of the bearing support plate 42 in the area of connection between the lubricant pipes 48, 56 and aperture 46 is considerably smaller than elsewhere around the circumference of the support due to the local radial stiffening effect of boss 44. This results in an uneven radial expansion of the outer bearing race together with flat areas in the bearing race which substantially limit the effective life of the roller bearings.

Referring now to FIG. 3, the unique stress relief cut through the bearing support plate 42 is shown generally at 72. The stress relief cut 72 includes a circumferentially extending cut 74 located radially outward of the connection between the lubricant pipes 48, 56 and aperture 46. The ends of the circumferential cut 74 connects with cuts 76, 76' which extend generally radially inward on the bearing support plate 42 and terminate at locations preferably radially inward of the connection between the lubricant pipes 48, 56 and aperture 46. The combination of the circumferential cut 74 together with the two generally radial cuts 76, 76' extend axially through the bearing support plate so as to isolate three sides of the boss 44 from the remainder of the bearing support plate.

Any previous restraint to uniform radial thermal expansion of the outer bearing race 40 caused by the uneven radial expansion of the bearing support plate 42 in the area of the localized boss 44 is now relieved by the circumferential and radial cuts through the bearing support plate. The radial stiffness of the thickened area of the support plate is broken by the intersecting circumferential cut 74 in cooperation with the two generally radial cuts 76, 76' on either side of the thickened area. As may be readily observed the outer bearing race 40 is now free to expand radially outward in a uniform manner under the aforementioned thermal stresses without having to overcome the localized radial stiffness of the thickened areas of the support plate.

Although the invention has been described in relation to a bearing assembly as included in a gas turbine engine, it is readily understood to have broader application to any bearing assembly subjected to non-uniform radial thermal stresses.

Having thus described one embodiment of the invention, what is desired to be secured by letters patent is as follows:

1. A bearing assembly for retaining an elongated shaft for rotation relative to a stator element including: an annular inner bearing race disposed for rotation with the shaft; an annular outer bearing race concentric with the inner bearing race and radially spaced apart therefrom; a plurality of rollers circumferentially disposed for rotation between the inner and outer bearing races; and an annular bearing support plate disposed between and fixedly connecting the outer race and stator element and having at least one area on the circumference of smaller radial expansion under thermal stress than generally found elsewhere on the circumference of the support plate, wherein the improvement comprises:

a stress relief cut through the bearing support plate for uniform thermal radial expansion along the entire circumference of the outer bearing race, wherein the stress relief cut includes a generally circumferential cut through the area of smaller radial expansion and two generally radial cuts extending inward from the circumferential cut on opposing sides of the area of smaller radial expansion.

2. The bearing assembly of claim 1 wherein the area of the bearing support plate of smaller thermal radial expansion is an axially thickened portion of the support plate.

3. The bearing assembly of claim 2 wherein the axially thickened portion includes an aperture therethrough, each end of which is in flow communication with a lubricant pipe, one pipe of which conducts lubricant from a reservoir, and the other pipe directs the lubricant to the area of the bearing surfaces.

* * * * *